US005160231A

United States Patent [19]

Miller

[11] Patent Number: 5,160,231

[45] Date of Patent: Nov. 3, 1992

[54] PRESS WITH QUICK ATTACH TOOL ALIGNMENT

[76] Inventor: Bernard Miller, 5600 Munhall Rd., Pittsburgh, Pa. 15217

[21] Appl. No.: 681,369

[22] Filed: Apr. 8, 1991

Related U.S. Application Data

[63] Continuation-in-part of Ser. No. 346,903, May 2, 1989, Pat. No. 5,006,022.

[51] Int. Cl.[5] .......... B23B 45/14

[52] U.S. Cl. .......... 408/135; 408/712; 408/110

[58] Field of Search .......... 408/712, 135, 110–112, 408/16, 76, 14, 136, 87, 95, 241 S; 409/182; 144/104, 83, 106, 803; 173/170

[56] References Cited

U.S. PATENT DOCUMENTS

| | | | |
|---|---|---|---|
| 1,794,149 | 2/1931 | Collins | 408/135 |
| 2,477,916 | 8/1949 | Wilhide | 408/712 X |
| 2,768,663 | 10/1956 | Jones | 408/712 X |
| 3,096,798 | 7/1963 | Pugsley . | |
| 3,141,360 | 7/1964 | Wolf | 408/110 |
| 3,810,710 | 5/1974 | Ennomoser | 408/111 |
| 3,890,058 | 6/1975 | Self et al. | 408/112 |
| 4,494,895 | 1/1985 | Leaf | 408/236 |
| 4,541,759 | 9/1985 | Miyoshi | 408/76 |
| 4,582,105 | 4/1986 | Wolff | 144/106 |
| 4,729,698 | 3/1988 | Haddon | 408/110 |
| 4,765,786 | 8/1988 | Krogh | 408/110 |
| 4,810,137 | 3/1989 | Yang | 408/100 |

FOREIGN PATENT DOCUMENTS

| | | | |
|---|---|---|---|
| 3120247 | 2/1983 | Fed. Rep. of Germany | 408/111 |

OTHER PUBLICATIONS

Sears Tool Catalogue GT 1990, p. 21.

*Primary Examiner*—Steven C. Bishop
*Attorney, Agent, or Firm*—Clyde I. Coughenour

[57] ABSTRACT

The invention is to an improvement for power tool presses of the type that clamp a portable tool, such as a drill, for use as the cutting means. A commonly used base, column, support bracket, rack and pinion and actuating handle are used. The press is provided with a pressure plate that is driven by the actuating handle to drive the cutting means. The power tool is securely and accurately positioned on a guide post or by parallel adjustable guide means. A single simple lock plate holds the power tool in position on the press or releases it for removal from the press. The tool is quickly removed from and quickly and accurately repositioned in alignment on the guide and easily clamped to it.

20 Claims, 3 Drawing Sheets

PRESS WITH QUICK ATTACH TOOL ALIGNMENT

CROSS-REFERENCE

This application is a continuation-in-part of U.S. Pat. No. 5,006,022 filed May 2, 1989 as Ser. No. 07/346,903 and issued Apr. 9, 1991.

BACKGROUND OF THE INVENTION

The invention is to a press for power tools. These devices can be of the permanent type, where the power means and support or stand are integral, or temporary, where the power means is removable or separable from the stand or press for independent use. The removable power means permits inexpensive hand tools to be independently used or attached to stands or presses for more stable use. However, the attachment means are usually cumbersome to use and require the operator to reposition the cutting means or its support after each attachment for proper alignment. This alignment is usually done by crude visual sighting or by drilling test holes until proper alignment is achieved. The end result depends on the skill of the mechanic and measuring means available to the mechanic. After each use the operator must choose between keeping the drill and stand unit intact for further future use or disassembling the drill from the stand for independent hand use. If the former is chosen, the tool is not available for independent use, which could necessitate purchase, storage and maintenance of another tool. If the latter is chosen, subsequent use requires another time-consuming assembly and alignment procedure.

Examples of various tool supports that temporarily or releasably secure hand tools for cutting wherein a drill press type arrangement results are U.S. Pat. Nos. 3,810,710 issued May 14, 1974 to Joseph Ennemoser and 4,494,895 issued Jan. 22, 1985 to Arthur Leaf and 4,582,105 issued Apr. 15, 1986 to Robert Wolff. Another example is the catalogue published by Sears Roebuck Co., Sears Tool Catalogue, GT 1990, page 21, Craftsman® Medium Duty Drill Stand, 9 NV 25920. Each of these references attach a hand tool and then advance the tool for cutting by a handle that usually operates a pinion and rack that is adjustably attached to a column by a support bracket. None of these accurately position the tool. Tools with internal guideways have been used. U.S. Pat. Nos. 4,080,092 issued Mar. 21, 1978 to Russell Hudson and 4,235,565 issued Nov. 25, 1980 to Matthew Albano and 4,810,137 issued Mar. 7, 1989 to Tai-Hor Yang are examples. None of these references secure the tool, they are simple guide means. Tools having external guideways have also been used. U.S. Pat. Nos. 2,837,939 issued Jun. 10, 1958 to Lion Leitner et al and 3,141,360 issued Jul. 21, 1964 to Samuel Wolf and 3,890,058 issued Jun. 17, 1975 to Edgar Self et al and 4,279,552 issued Jul. 21, 1981 to Ira Epstein are examples. None of these references secure the tool, they form simple guide means.

It is also common practice to provide external support for securing and positioning cutting means. Examples of these are U.S. Pat. Nos. 3,096,798 issued Jul. 9, 1963 to Lawrence Pugsley and 3,107,556 issued Oct. 22, 1963 to Lawrence Pugsley and 4,729,698 issued Mar. 8, 1988 to Jesse Haddon and 4,765,786 issued Aug. 23, 1988 to Kris Krogh. These devices all use the power tool handle as the means for moving the tool for cutting and all of them have the tool move relative to the guide means.

SUMMARY OF THE INVENTION

The present invention is an improvement over the tool guides and supports of the prior art. The tool is provided with a guideway that is on the same side of the tool chuck centerline as the gripping means so that visibility in the cutting zone, and the ability to access corners, is unimpaired. By the use of any shape non-circular guideway, rotation of the tool on the guide is precluded, assuring linear movement using only one post.

For adaptation to a press, a pressure plate with a guide is provided so that a simple lock plate using only one or two easily secured clamping means in combination with a guide means accurately positions and secures a hand tool. The pressure plate attaches to a standard rack or other handle reciprocated movable press part. With the tool in place, it functions as a standard tool press. The hand tool can be removed from the press for independent use and replaced on the press in precisely the same position and alignment as before, even by an unskilled mechanic.

In one embodiment a special slot in a hand tool is used with a guide post on the pressure plate. In other embodiments parallel adjustable guides are provided so that the guide means can be used with any of the standard hand tool sizes and shapes including those provided with guide recesses.

DETAILED DESCRIPTION OF THE PREFERRED EMBODIMENT

Figure 1:
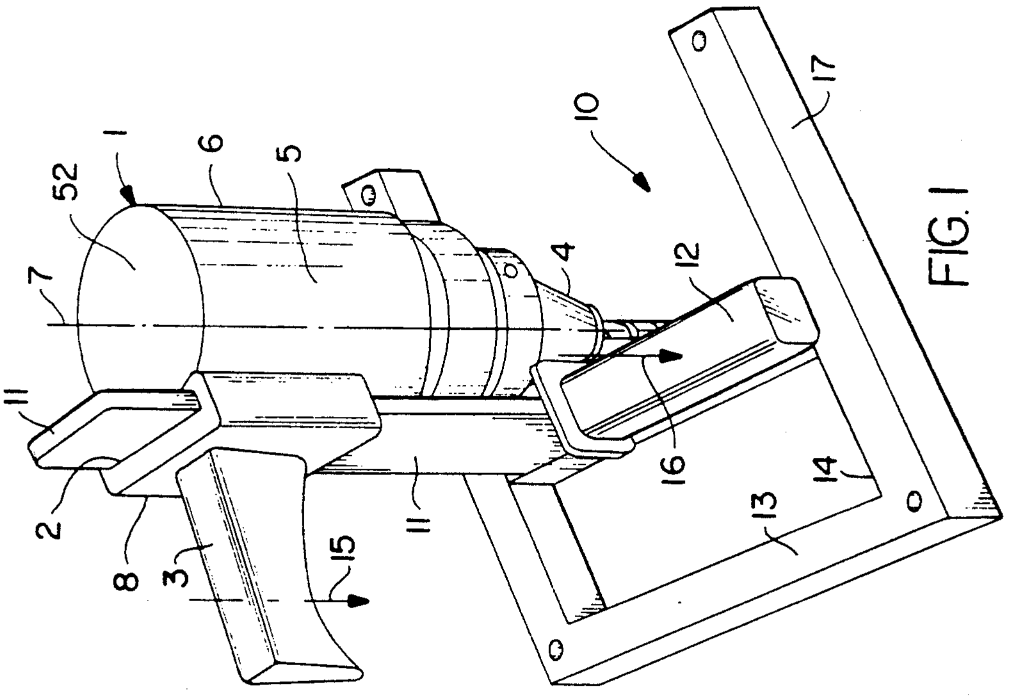
FIG. 1 is a perspective view of a tool useable with a post alignment means mounted on a guide post.

In accordance with the present invention, a hand held tool, such as a drill (1) shown in FIG. 1, is provided with an internal guideway (8) provided with a slot (2) on the same side of the tool chuck centerline (7) as the tool gripping means (3). Such positioning leaves the front (6) and sides (5) of the tool free from obstructions and, for example, the cutting means holder or chuck assembly for a drill (4) accessible for use of a drill key and permits unobstructed visibility in the cutting zone during use. The guideway slot (2) is parallel to the tool axis so that the line of force (15) applied to the tool grip advances the tool toward and into the work at the angle determined by the positioning of the guide post.

As shown in FIG. 1, the guide means (10) consists of a base (13, 17), a post (11), and a handle (12). The base with cross members (13) and spaced supports (17), can take any convenient configuration, such as spaced supports in the form of an H or an A with parallel legs or a U, etc., so long as the footprint or area encompassed is large enough to enclose the projection of the lines of force (15, 16) applied to the handle and tool grip. The base shown has the spaced supports (17) positioned by base cross members (13). This is preferred because it can be used on narrow work such as 2×4's. The handle (12) can be positioned at any point within the footprint; it can project inwardly from any area on the periphery of the base or can be attached to the post. The lower end of the post (11) can be positioned at any point within the footprint of the base. In a preferred embodiment the handle (12) is secured to the post (11). To have both the post and handle positioned reasonably close to the center of the footprint, the post is offset from the center of the base footprint. It can be seen that both the force (15) applied to the grip and force (16) applied to the handle, project within the footprint of the base (13, 17).

Figure 2:
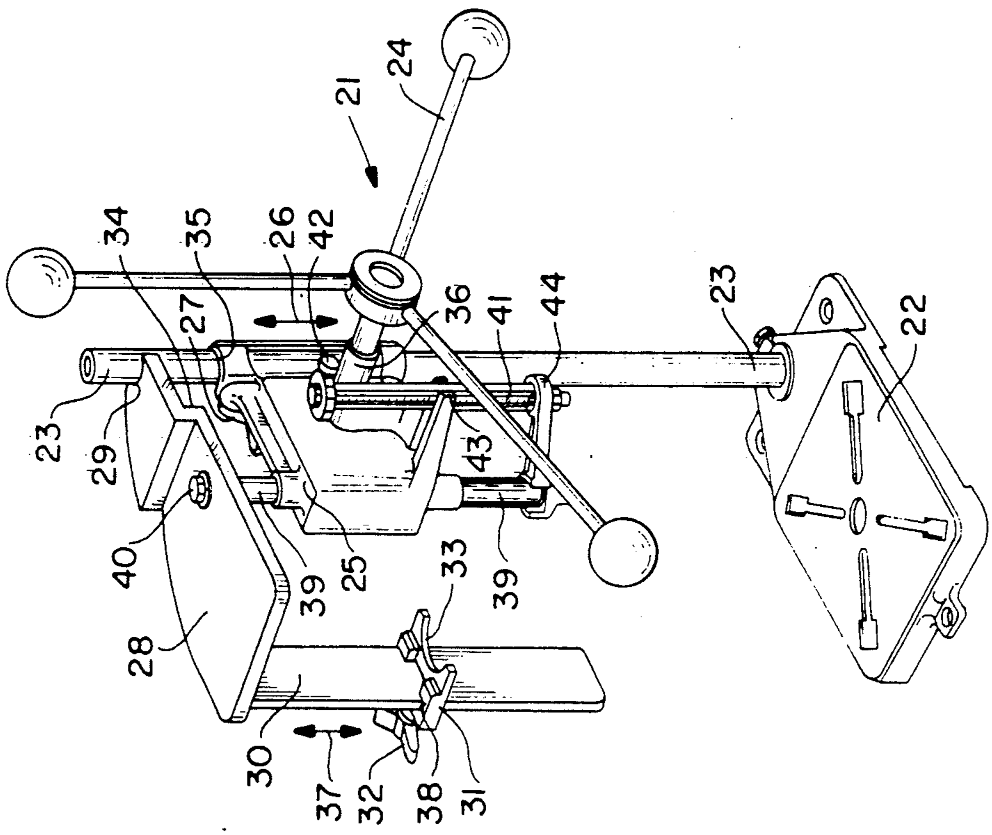
FIG. 2 is a perspective view of a press including an internal quick post attachment tool alignment means of the present invention.

In a similar manner an attachment can be provided or added to many commonly used tool or drill stands to quickly secure and align hand tools. FIG. 2 shows the invention attached to a standard commercially available type drill stand or press (21). The base plate (22) has attached to it the usual vertical column (23), shown here as a round pipe. A support bracket (25) is slidably (26) mounted on the column (23) and has one or more of the standard clamping means (27) to position the support bracket on the column. The support bracket houses the usual actuator means, preferably a pinion and return spring (not shown) and supports the actuating handle (24) used to turn the pinion and move the rack (39) down to force the cutting means into the work to be cut. The upper end of the rack which acts as the pressure source for attached pressure plate (28) joined by a connector shown as a bolt (40). The lower extremity of the rack (39) has attached to it a bar scale support (44) for a bar scale (41). The bar scale (41) is provided with an adjustable stop (42) that contacts bracket stop means (43) attached to the support bracket (25) to control cut depth. Pressure plate (28) is provided on one end with a column guideway (29), a curved recess that slides against or in close proximity to the column (23) as the pressure plate reciprocates up and down (37). On a second end of the pressure plate (28) an elongated guide post (30) is attached. The guide post extends downwardly parallel to the column (23). The guide post supports a lock plate (31). The lock plate (31) is vertically slidable on the guide post and can be locked in place by clamp means (32). The lock plate (31) is provided with a slot (38) for receiving the guide post (30) and a recess (33) for positioning or accommodating a tool chuck (4) and uses the clamp (32) for locking a tool against the pressure plate (28).

Figure 3:
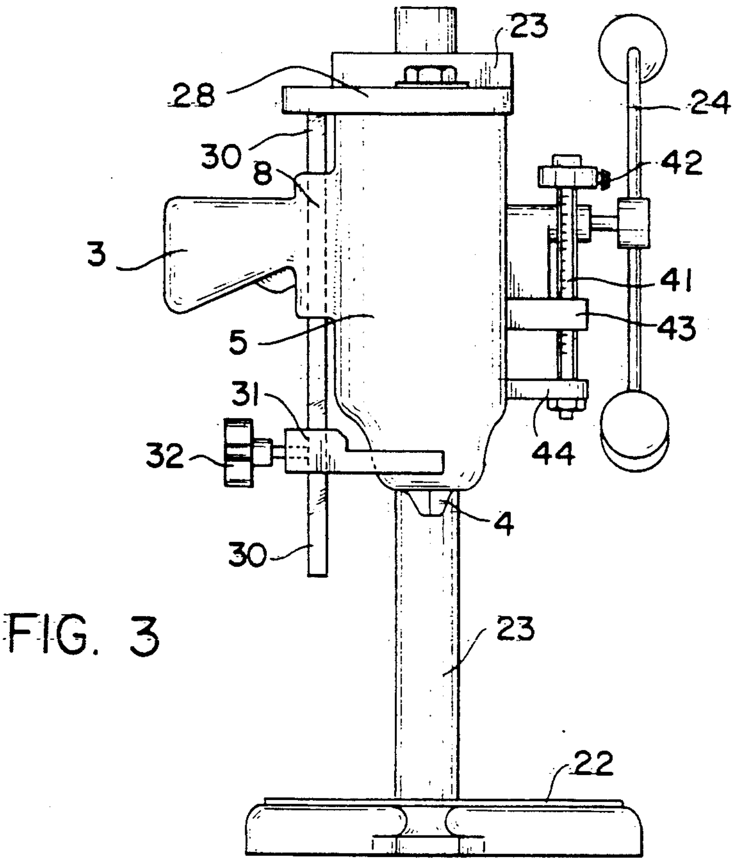
FIG. 3 is a front view of the press of FIG. 2 with the tool of FIG. 1 attached.

In use, the base plate (22) is usually secured to a work bench by screws or bolts. The support bracket (25) is adjusted on the column (23) so that the cutting means of the tool to be used will be set a desired distance above the base plate (22). The lock plate (31) is removed. The tool to be used, shown as a drill, has the slot (2) placed over the guide post (30) and is slid upward until the back (52) of the tool presses against the pressure plate (28). Then the lock plate (31) is slid up the guide post (30) past the chuck (4), and any other rotatable components, to contact the tool. The chuck recess (33) permits the chuck to extend below the lock plate for cutting, blade insertion and removal. The lock plate is secured in place using threaded clamp means (32) holding the hand tool against the pressure plate as shown in FIG. 3. Since the guide post and slot have only a small clearance or tolerance, the position and alignment of the tool will be the same each time the tool is inserted onto the post. Since the tool slot (2) is parallel to the column (23) and to the guide post (30) and to the cutting tool center line (7), cutting will be perpendicular to the base plate (22).

Figure 4:
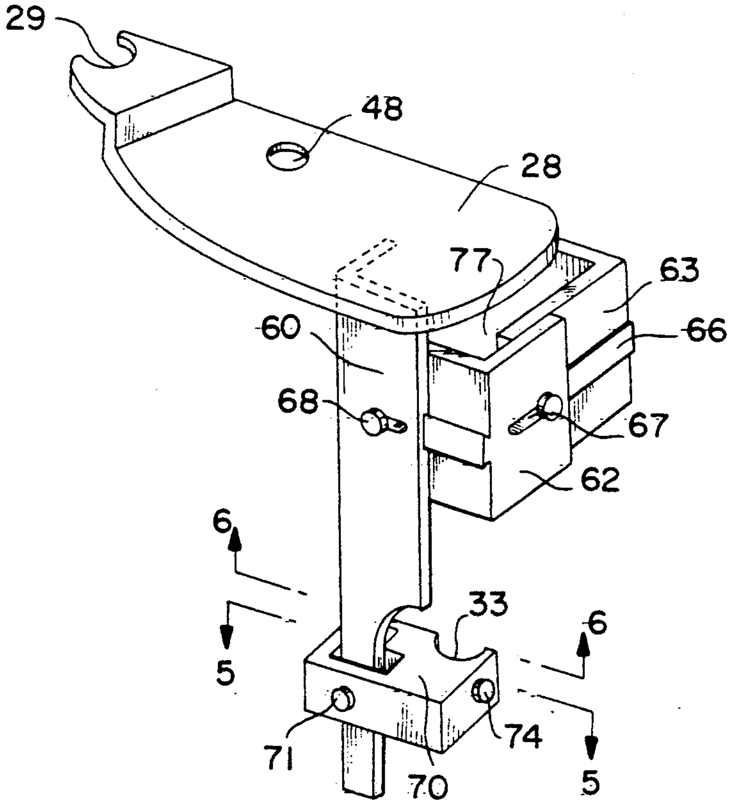
FIG. 4 is a perspective view of a second embodiment for an external quick attachment tool alignment means of the present invention.
Figure 6:
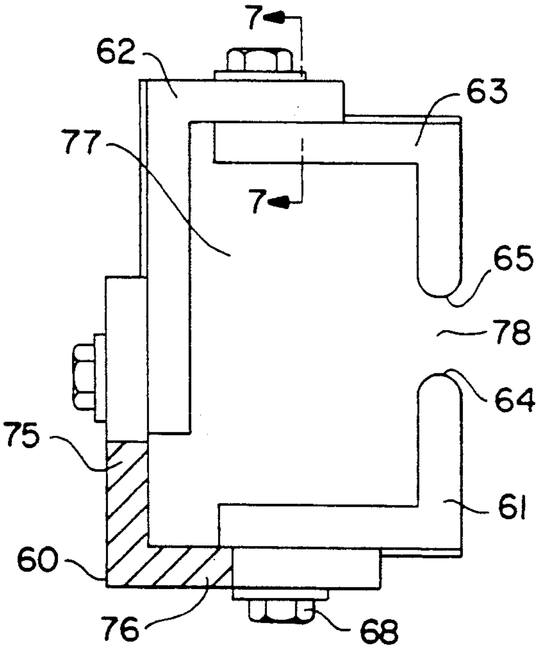
FIG. 6 is a sectional view taken along line 6—6 showing the adjustable alignment means of FIG. 4.
Figure 7:
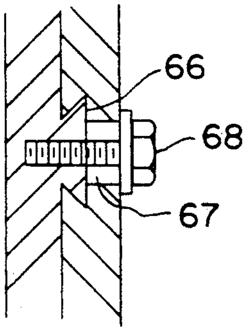
FIG. 7 is a sectional view taken along line 7—7 showing attachment of the alignment means angle sections of FIG. 6.
Figure 10:
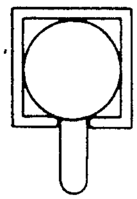
Figure 11:
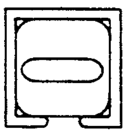
Figure 12:
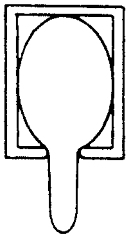

A second embodiment is shown in FIG. 4. This embodiment can be used with the same type presses as the embodiment shown in FIG. 2. The basic difference between the embodiment shown in FIG. 2 and that shown in FIG. 4 is that the guide post (30) of FIG. 2 is for use as an internal alignment means while that of FIG. 4 is for use as an external alignment means. In the embodiment of FIG. 4, an elongated angle post (60) is attached to the pressure plate (28) in a manner similar to that of guide post (30). A hole (48) is provided for attachment to a rack (39) or other pressure source. A short distance below the pressure plate, three other angle sections (61, 62, 63) slidably engage each other and 60 to form an elongated open area (77) of essentially rectangular or square internal configuration as shown in FIG. 6. While any desired securing means may be used, it is preferred that each angle section be slidably joined to the adjacent angle section by a tongue and groove connection (66) as shown in FIG. 7. To secure the angle sections, an elongated aperture (67), in alignment with the tongue and groove, is provided in the outer overlapping angle section. Preferably a bolt (68) extends through the aperture (67) and is threaded into the tongue of the inner overlapping section to clamp the two together as the greatest thread area is present there. The four angle sections (60-63) can be adjusted to form an elongated open area (77) that can function as a close fitting guide for any of the common circular, oval, rectangular, square or other shape tools. An elongated slit (78) is provided between the angle sections (61, 63) as shown between parallel extensions or end edges (64, 65). The elongated slit (78) permits a tool of the type having a handle extending beyond the body proper to protrude through, while the tool proper is positioned within the elongated open area (77) provided between the angle sections. The standard tool is positioned by having the internal surfaces of the angle sections (60-63) contact the external surfaces of the tool body proper. Once the angle sections are secured in the desired position to accommodate a specific tool, the tool can be removed and then reinserted in the exact same position. FIGS. 10-12 depict the guide means securing a circular and square and oval tool respectively. The tools of FIGS. 10 and 12 show the tool handle protruding through the elongated slit while FIG. 11 shows the tool handle over the tool centerline.

Figure 8:
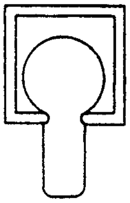
FIGS. 8-12 are simplified plan views depicting uses of the alignment means of FIG. 4.
Figure 9:
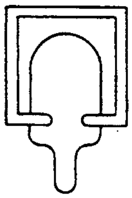

In addition to the standard shape power tools, many are provided with external guide means in the form of a depression or recesses that can be in or on the tool body proper or handle. The end edges (64, 65) of two angle sections (61, 63) can be formed into any desired shape to accommodate such external guide means. Tools that are provided with external alignment depressions or recesses are positioned by having the shaped edges (64, 65) that form the elongated slit (78) protrude into the depressions or recesses. With the external guide means of the tool secured by the shaped end edges (64, 65), it is not necessary that the tool fit closely within the guide means elongated open area (77). FIGS. 8 and 9, in simplified form, depict the guide means positioning a tool by adjusting the spacing between the shaped edges (64, 65) of the two angle sections (61, 63) to accommodate the tool recesses at the beginning or base of the handle and within the tool body proper, respectively.

Figure 5:
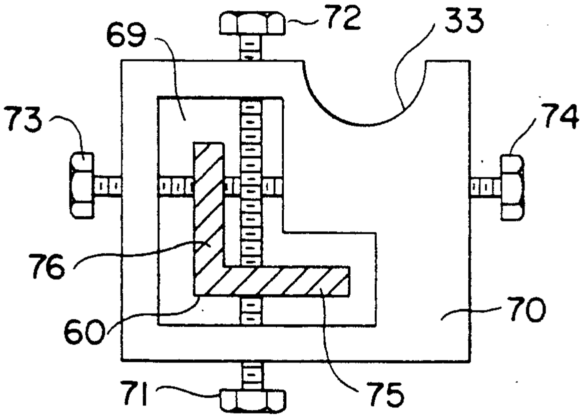
FIG. 5 is a sectional view taken along line 5—5 showing the locking plate used to secure the hand tool in FIG. 4.

Because the angled sections (60-63) must be adjustable to accommodate different size and shape tools, the position of the tool chuck will vary some. To provide for shifting of the chuck, the lock plate has been modified so that the chuck recess (33) can be properly positioned. To do this an "L" shaped slot (69) has been provided in a modified locking plate (70). The slot (69) is in the same general shape as the angle section (60) but is several times larger than the cross-section of the angle section (60) as shown in FIG. 5. To secure the desired position of the chuck recess (33) with respect to the guide means, the thickness of the lock plate (70) has been increased and four threaded bolts (71-74) have been provided. The top two bolts (71, 72) thread through the top portion of the lock plate to abut and secure the lock plate with respect to one leg (75) of the angle section (60) and the two bottom bolts (73, 74) thread through the bottom portion of the lock plate to abut and secure the lock plate with respect to the other leg (76) of the angle section (60). With the chuck recess (33) properly positioned and the tool pressed up against the pressure plate (28), the locking plate is slid up the angle section (60) to hold the tool against the pressure plate (28) while the angle sections (60-63) position the tool in a fixed location. Once the proper position of the chuck recess is obtained, the two most remote bolts (e.g. 72, 73) are used only to position the lock plate while the most accessible bolts (71, 74) are used to secure the lock plate in position.

Parallel adjustable guide extensions for internal or external use can be provided simply by attaching one rod of any desired cross-section, such as square, to the pressure plate, as was done with the post (30) of FIG. 2, and securing another in an elongated slot formed in the pressure plate, similar to that of FIG. 7. Since essentially only the weight of the hand tool presses onto the lock plate, a locking plate similar to that of FIG. 5 with a square or rectangular slot can be attached to one of the two parallel rods.

It is believed that the construction, operation and advantages of this device will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What I claim is:

1. A guide means attachment for use with a hand held power tool on a tool press comprising:

- an elongated pressure plate for attachment essentially perpendicular to a column of said tool press;
- an attachment means for securing said pressure plate onto said tool press;
- an elongated guide and alignment means attached to and extending essentially perpendicular from said elongated pressure plate for positioning said power tool on said elongated pressure plate with the axis of said power tool and said elongated guide and alignment means essentially parallel to said column of said tool press;
- a locking means slidably attached to said elongated guide and alignment means and clampable thereto for locking said power tool against said pressure plate and onto said elongated guide and alignment means.

2. A guide means attachment for use with a hand held power tool on a tool press as defined in claim 1 wherein a curved recess is provided on one end of said elongated pressure plate for sliding against said column of said tool press and wherein said elongated guide and alignment means has a uniform non-circular cross-section throughout its length for slidably fitting within a slot provided in said power tool.

3. A guide means attachment for use with a hand held power tool on a tool press as defined in claim 1 wherein said elongated guide and alignment means is composed of a first angle section attached to said pressure plate and other angle sections attached to said first angle section wherein said angle sections slide relative to each other to adjust the size and shape of an elongated open area formed by said angle sections to form an external guide to accommodate different size and shape tools.

4. A guide means attachment for use with a hand held power tool on a tool press as defined in claim 1 wherein said locking means has a slot for slidably moving it along said elongated guide and alignment means;

- a clamp means on said locking means for securing said locking means to said elongated guide and alignment means for retaining said power tool against said elongated pressure plate.

5. An attachment and guide means for use with hand held power tools comprising:

- a column;
- means for reciprocating parallel to said column;
- a pressure plate attached to and extending outwardly from said means for reciprocating parallel to said column;
- an elongated alignment guide means attached to and extending outwardly from said pressure plate so as to be essentially parallel to said column for slidably guiding and aligning said power tool against said pressure plate;
- an adjustable locking means on said elongated alignment guide means for removably securing said aligned power tool against said pressure plate on said alignment guide means so that said means for reciprocating parallel to said column and said pressure plate and said elongated alignment guide means and said power tool and said adjustable locking means can function as one rigid unit.

6. An attachment and guide means as defined in claim 5 wherein said pressure plate is elongated and one end of said elongated pressure plate is provided with a column guideway for slidably positioning said pressure plate with respect to said column and a second end of said elongated pressure plate has said elongated alignment guide means attached to it.

7. An attachment and guide means as defined in claim 5 wherein said elongated alignment guide means is a guide post that slidably fits within a slot provided in said hand held power tool and wherein said adjustable locking means is a locking plate that has a slot that slidably fits over said guide post to secure said power tool in position on said guide post.

8. An attachment and guide means as defined in claim 5 wherein said adjustable locking means is a locking plate that has a slot that slidably fits over said elongated alignment guide means, a clamping means on said locking plate to secure said hand held power tool in aligned position on said guide means.

9. An attachment and guide means as defined in claim 8 wherein said locking plate is provided with a recess to accommodate a tool chuck.

10. An attachment and guide means as defined in claim 5 wherein said elongated alignment guide means include parallel spaced extensions through which a grip on said power tool can pass.

11. An attachment and guide means as defined in claim 5 wherein said enlongated alignment guide means is composed of a first angle section attached to said pressure plate and other angle sections are attached to said first angle section wherein said angle sections slide relative to each other to adjust the size and shape of an elongated open area formed by said angle sections to form an external guide to accommodate different size and shape tools.

12. An attachment and guide means as defined in claim 10 wherein said parallel extensions are shaped to form an external guide that can slidably fit recesses in the handle or body of said power tool.

13. An attachment and guide means as defined in claim 10 wherein means are provided for adjusting the distance between said parallel spaced extensions.

14. An attachment and guide means as defined in claim 11 wherein said adjustable locking means is provided with a recess to accommodate a tool chuck, and an "L" shaped slot larger in cross section than said first angle section, and means for positioning said recess with respect to said first angle section to accommodate the chucks of different size and shape tools.

15. An attachment and guide means as defined in claim 14 wherein said first angle section is formed with two legs each having two surfaces and said means for positioning said recess are threaded means in said adjustable locking means that abut both surfaces of both legs of said first angle section.

16. A tool press for use with hand held tools comprising:

a base plate for supporting a tool press;

a column attached to said base plate;

a support bracket adjustably attached to said column;

means for reciprocating parallel to said column mounted to said support bracket;

a handle supported by said support bracket for moving said means for reciprocating parallel to said column;

a pressure plate attached to said means for reciprocating parallel to said column;

an elongated guide and alignment means for said hand held tool attached to said pressure plate and extending essentially parallel to said column;

a lock plate adjustably secured to said elongated guide and alignment means for locking said hand held tool to said guide and alignment means and against said pressure plate.

17. A tool press as defined in claim 16 wherein said elongated guide and alignment means is a guide post attached to said pressure plate parallel to said column such that a slot formed in said hand held tool will slidably receive said guidepost.

18. A tool press as defined in claim 17 wherein said lock plate is provided with a slot that slidably receives said guide post, and a threaded clamping means that secures said lock plate to said guide post to secure said hand tool against said pressure plate.

19. A tool press as defined in claim 16 wherein said elongated guide and alignment means is an external guide means composed of a first angle section attached to said pressure plate and other angle sections attached to said first angle section that slide relative to one another to adjust the size and shape of an elongated open area formed between said angle sections to accommodate different size and shape tools.

20. A tool press as defined in claim 19 wherein two of said angle sections have shaped spaced edges that form a slit between which a handle of said tool can pass or by which a tool having recesses on the handle or tool body proper can be aligned.

* * * * *

UNITED STATES PATENT AND TRADEMARK OFFICE
CERTIFICATE OF CORRECTION

PATENT NO. : 5,160,231

DATED : Nov. 3, 1992

INVENTOR(S) : Bernard Miller

It is certified that error appears in the above-identified patent and that said Letters Patent is hereby corrected as shown below:

The title page, showing illustrative figure, should be deleted and substitute therefor the attached title page.

Signed and Sealed this

Twentieth Day of April, 1993

*Attest:*

MICHAEL K. KIRK

*Attesting Officer*

*Acting Commissioner of Patents and Trademarks*

US005160231A

United States Patent [19]

Miller

[11] Patent Number: 5,160,231

[45] Date of Patent: Nov. 3, 1992

[54] PRESS WITH QUICK ATTACH TOOL ALIGNMENT

[76] Inventor: Bernard Miller, 5600 Munhall Rd., Pittsburgh, Pa. 15217

[21] Appl. No.: 681,369

[22] Filed: Apr. 8, 1991

Related U.S. Application Data

[63] Continuation-in-part of Ser. No. 346,903, May 2, 1989, Pat. No. 5,006,022.

[51] Int. Cl.[5] .......... B23B 45/14

[52] U.S. Cl. .......... 408/135; 408/712; 408/110

[58] Field of Search .......... 408/712, 135, 110-112, 408/16, 76, 14, 136, 87, 95, 241 S; 409/182; 144/104, 83, 106, 803; 173/170

[56] References Cited

U.S. PATENT DOCUMENTS

| | | | |
|---|---|---|---|
| 1,794,149 | 2/1931 | Collins | 408/135 |
| 2,477,916 | 8/1949 | Wilhide | 408/712 X |
| 2,768,663 | 10/1956 | Jones | 408/712 X |
| 3,096,798 | 7/1963 | Pugsley . | |
| 3,141,360 | 7/1964 | Wolf | 408/110 |
| 3,810,710 | 5/1974 | Ennomoser | 408/111 |
| 3,890,058 | 6/1975 | Self et al. | 408/112 |
| 4,494,895 | 1/1985 | Leaf | 408/236 |
| 4,541,759 | 9/1985 | Miyoshi | 408/76 |
| 4,582,105 | 4/1986 | Wolff | 144/106 |
| 4,729,698 | 3/1988 | Haddon | 408/110 |
| 4,765,786 | 8/1988 | Krogh | 408/110 |
| 4,810,137 | 3/1989 | Yang | 408/100 |

FOREIGN PATENT DOCUMENTS

| | | | |
|---|---|---|---|
| 3120247 | 2/1983 | Fed. Rep. of Germany | 408/111 |

OTHER PUBLICATIONS

Sears Tool Catalogue GT 1990, p. 21.

*Primary Examiner*—Steven C. Bishop
*Attorney, Agent, or Firm*—Clyde I. Coughenour

[57] ABSTRACT

The invention is to an improvement for power tool presses of the type that clamp a portable tool, such as a drill, for use as the cutting means. A commonly used base, column, support bracket, rack and pinion and actuating handle are used. The press is provided with a pressure plate that is driven by the actuating handle to drive the cutting means. The power tool is securely and accurately positioned on a guide post or by parallel adjustable guide means. A single simple lock plate holds the power tool in position on the press or releases it for removal from the press. The tool is quickly removed from and quickly and accurately repositioned in alignment on the guide and easily clamped to it.

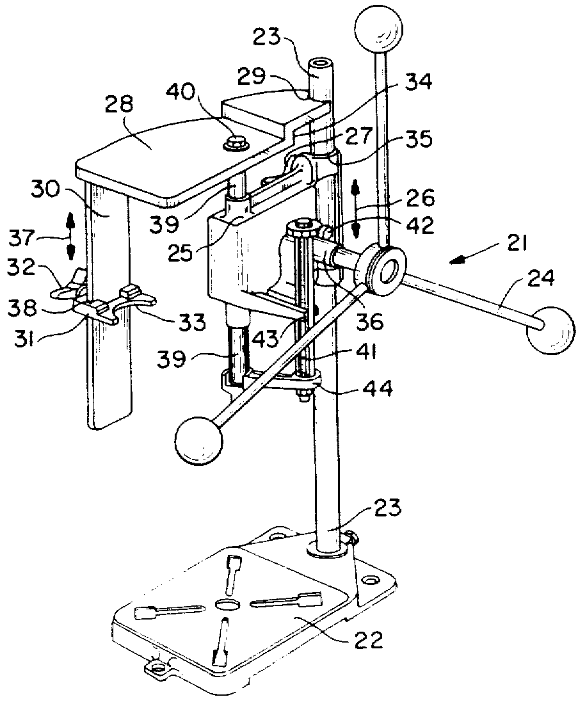

20 Claims, 3 Drawing Sheets